3,015,660
9-CARBOXYALKYL-9-PYRID[3,4-b]INDOLE PIPERAZIDES

Richard A. Robinson, Evanston, Ill., assignor to G. D. Searle & Co., Chicago, Ill., a corporation of Delaware
No Drawing. Filed Nov. 12, 1959, Ser. No. 852,200
7 Claims. (Cl. 260—268)

The present invention is concerned with novel piperazides of heterocyclic alkanoic acids, and especially with piperazides of 9-carboxyalkyl-9-pyrid[3,4-b]indoles as represented by the structural formula

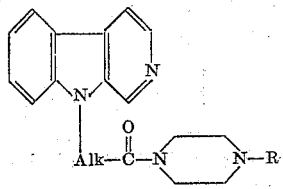

wherein Alk is a lower alkylene radical, and R is selected from the group consisting of hydrogen, lower alkyl, hydroxy(lower alkyl), and (lower alkanoyloxy)(lower alkyl) radicals.

Examples of the lower alkylene radicals represented by Alk are methylene, ethylene, trimethylene, tetramethylene, and the branched-chain isomers thereof. The lower alkyl radicals designated by R are typified by methyl, ethyl, propyl, butyl, pentyl, hexyl, and the isomeric branched-chain groups. Lower alkanoyl radicals encompassed by the R function are exemplified by formyl, acetyl, propionyl, butyryl, valeryl, caproyl, and the isomeric branched-chain groups.

The compounds of this invention can be manufactured by the process shown below:

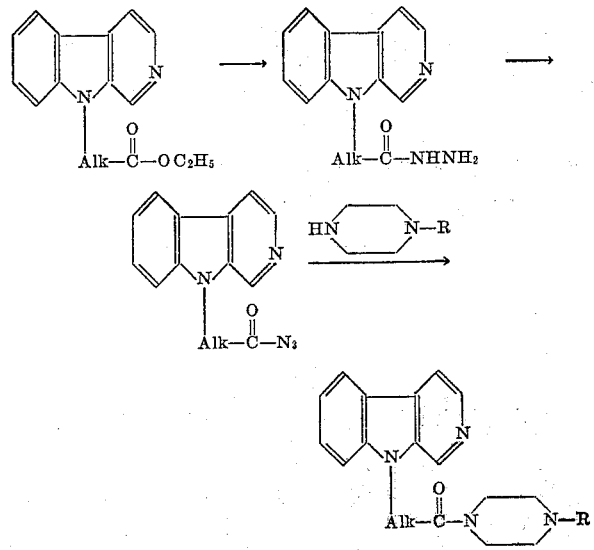

As a specific example of this process, 9-(2-carbethoxyethyl)-9-pyrid[3,4-b]indole is treated with hydrazine hydrate to form the hydrazide, which is mixed with nitrous acid to yield the azide. The latter compound is condensed with 1-(2-hydroxyethyl)piperazine to afford 9-(2-carboxyethyl)-9-pyrid[3,4-b]indole 4-(2-hydroxyethyl)piperazide.

The starting esters represented above can be manufactured from 9-pyrid[3,4-b]indole by a variety of methods. For example, reaction of this heterocyclic amine with ethyl acrylate results in 9-(2-carbethoxyethyl)9-pyrid[3,4-b]indole. To illustrate further, 9-pyrid[3,4-b]indole can be treated first with phenyl-lithium then with ethyl 4-(p-toluenesulfonyloxy)butyrate to produce 9-(3-carbethoxypropyl)-9-pyrid[3,4-b]indole.

The 9-carboxyalkyl-9-pyrid[3,4-b]indole 4-hydroxy-(lower alkyl)piperazides of this invention can be converted to the corresponding instant lower alkanoates by reaction with a lower alkanoyl chloride in a lower alkanoic acid solvent medium. Typically, the aforementioned 9-(2-carboxyethyl)-9-pyrid[3,4-b]indole 4-(2-hydroxyethyl)piperazide is treated with acetyl chloride in acetic acid to yield 9-(2-carboxyethyl)-9-pyrid[3,4-b]indole 4-(2-acetoxy)piperazide.

The compounds of this invention are useful as a result of their valuable pharmacological properties. They are, for example, anti-inflammatory agents as evidenced by their ability to inhibit the local edema formation associated with inflammatory states.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

Example 1

To a mixture of 34 parts of 9-pyrid[3,4-b]-indole and 1500 parts of ethyl acrylate, at 95–100°, is added portionwise with stirring over a period of 2 hours, 6 parts of a 40% aqueous solution of benzyltrimethylammonium hydroxide. The reaction mixture is cooled, diluted with ether, and the organic solution washed with water and dried over anhydrous sodium sulfate. The ether solution is treated with propanolic hydrogen chloride to precipitate 9-(2-carbethoxyethyl)9-pyrid[3,4-b]indole hydrochloride, M.P. 220°.

Example 2

To a solution of 48 parts of ethyl 4-hydroxybutyrate in 60 parts of pyridine is added, at −5°, a solution of 84 parts of p-toluenesulfonyl chloride in 150 parts of pyridine. The reaction mixture is stirred for about one and one-half hours, allowed to stand for about 6 hours, then poured into ice water. The resulting mixture is extracted with benzene and the organic layer washed successively with dilute sulfuric acid and aqueous sodium carbonate, dried over anhydrous sodium sulfate, and evaporated to dryness in vacuo to afford ethyl 4-(p-toluenesulfonyloxy)butyrate.

To a solution of 17 parts of 9-pyrid[3,4-b]indole in 400 parts of benzene is added 10 parts of phenyllithium dissolved in 100 parts of ether, the mixture stirred for about 2 hours, then treated with 30 parts of ethyl 4-(p-toluenesulfonyloxy)butyrate. This reaction mixture is allowed to react with stirring for about 4 hours, then washed with water. The water washings are extracted with ether and the extracts combined with the benzene solution. This organic solution is dried over anhydrous sodium sulfate, then treated with propanolic hydrogen chloride, resulting in 9-(3-carbethoxypropyl)-9-pyrid[3,4-b]indole hydrochloride.

Example 3

An aqueous solution of 145 parts of 9-(2-carbethoxyethyl)-9-pyrid[3,4-b]indole hydrochloride is made alkaline by the addition of sodium bicarbonate, and the resulting mixture is extracted with ether. The ether solution is freed of solvent by distillation and the residual free base mixed with 170 parts of 100% hydrazine hydrate. This reaction mixture is heated on the steam bath for about 2 hours, cooled; and the resulting precipitate collected by filtration, washed successively with water and isopropanol, and dried to afford 9-(2-carboxyethyl)-9-pyrid[3,4-b]indole hydrazide, M. P. 167–168°.

To a solution of 51 parts of 9-(2-carboxyethyl)-9-pyrid[3,4-b]indole hydrazide and 27 parts of 38% hydrochloric acid in 3000 parts of water is added, at 0±2°, 20 parts of sodium nitrite. The reaction mixture is stirred for about 5 minutes, treated with excess sodium bicarbonate, and extracted with chloroform.

The chloroform solution is dried over anhydrous potassium carbonate, then mixed rapidly with a solution of 20 parts of piperazine in about 1000 parts of chloroform. The reaction mixture is allowed to stand at room temperature for about 4 hours, then filtered and the filtrate evaporated to dryness in vacuo. The residue is crystallized from benzene to afford 9-(2-carboxyethyl)-9-pyrid[3,4-b]-indole piperazide, M.P. 102–105°. Addition of propanolic hydrogen chloride to a benzene solution of this free base results in formation of the dihydrochloride, M.P. 302°.

By substituting an equivalent quantity of 9-(3-carbethoxypropyl)-9-pyrid[3,4-b]indole hydrochloride and otherwise proceeding according to the herein-described processes, 9-(3-carboxypropyl)-9-pyrid[3,4-b]indole piperazide is obtained.

Example 4

By the process described in Example 3 preceeding, 30.2 parts of 1-(2-hydroxyethyl)piperazine is treated with the azide produced from 51 parts of 9-(2-carboxyethyl)-9-pyrid[3,4-b]indole hydrazide to produce 9-(2-carboxyethyl)-9-pyrid[3,4-b]indole 4-(2-hydroxyethyl)piperazide. Treatment of this free base with propanolic hydrogen chloride according to the procedure described in Example 3 affords the corresponding dihydrochloride, M.P. 244°.

Example 5

The substitution of equivalent quantities of 9-(3-carbethoxypropyl)-9-pyrid[3,4-b]indole hydrochloride and 1-(3-hydroxypropyl)piperazine for 9-(2-carbethoxyethyl)-9-pyrid[3,4-b]indole hydrochloride and 1-(2-hydroxyethyl)piperazine, respectively, in the procedure of Example 3 results in 9-(3-carboxypropyl)-9-pyrid[3,4-b]indole 4-(3-hydroxypropyl)piperazide and its dihydrochloride.

Example 6

A chloroform solution of the azide prepared from 51 parts of 9-(2-carboxyethyl)-9-pyrid[3,4-b]-indole described in Example 3, is mixed rapidly with 23.3 parts of 1-methylpiperazine dissolved in about 1000 parts of chloroform. The reaction mixture is stored at room temperature for about 6 hours, filtered, and the filtrate concentrated to dryness under reduced pressure. Crystallization of the residue from benzene affords 9-(2-carboxyethyl)-9-pyrid[3,4-b]indole 4-methylpiperazide. Treatment of this free base in benzene with propanolic hydrogen chloride produces the dihydrochloride.

By substituting equivalent quantities of 9-(3-carboxypropyl)-9-pyrid[3,4-b]indole azide and 1-ethylpiperazine in the herein-described processes, 9-(3-carboxypropyl)-9-pyrid[3,4-b]indole 4-ethylpiperazide and its dihydrochloride are obtained.

Example 7

A mixture of 11 parts of 9-(2-carboxyethyl)-9-pyrid[3,4-b]indole 4-(2-hydroxyethyl)piperazide dihydrochloride, 15 parts of acetyl chloride, and 100 parts of glacial acetic acid is allowed to stand at room temperature for about 2 hours. Dilution of this reaction mixture with ether results in precipitation of the product, which can be recrystallized from isopropanol to afford pure 9-(2-carboxyethyl)-9-pyrid[3,4-b]indole 4-(2-acetoxyethyl)piperazide dihydrochloride, M.P. 225°.

Example 8

A mixture of 11.8 parts of 9-(3-carboxypropyl)-9-pyrid[3,4-b]indole 4-(3-hydroxypropyl)piperazide, 17.7 parts of propionyl chloride, and 125 parts of propionic acid is allowed to react for about 4 hours. Dilution of the reaction mixture with ether results in precipitation of the product, 9-(3-carboxypropyl)-9-pyrid[3,4-b]indole 4-(3-propionoxypropyl)piperazide dihydrochloride.

What is claimed is:

1. A compound of the structural formula

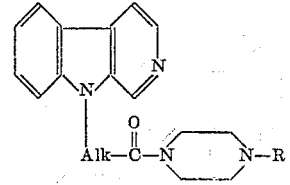

wherein Alk is a lower alkylene radical and R is selected from the group consisting of hydrogen, lower alkyl, hydroxy (lower alkyl), and (lower alkanoyloxy) (lower alkyl) radicals.

2. A compound of the structural formula

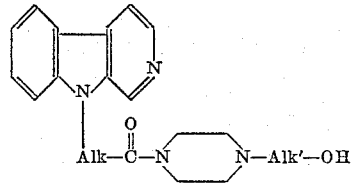

wherein Alk and Alk' are lower alkylene radicals.

3. A compound of the structural formula

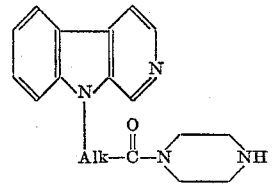

wherein Alk is a lower alkylene radical.

4. A compound of the structural formula

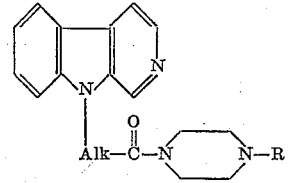

wherein Alk is a lower alkylene radical and R is a lower alkyl radical.

5. 9-(2-carboxyethyl)-9-pyrid[3,4-b]indole piperazide.
6. 9 - (2-carboxyethyl)-9-pyrid[3,4-b]indole 4-(2-hydroxyethyl)piperazide.
7. 9 - (2-carboxyethyl)-9-pyrid[3,4-b]indole 4-(2-acetoxyethyl)piperazide.

References Cited in the file of this patent
UNITED STATES PATENTS
2,752,393    Martin _____ Apr. 14, 1951